No. 651,424. Patented June 12, 1900.
J. G. McCARTER & T. HANSEN.
SEAM RUBBING AND WELT PROTECTING MACHINE.
(Application filed Dec. 26, 1899.)
(No Model.)
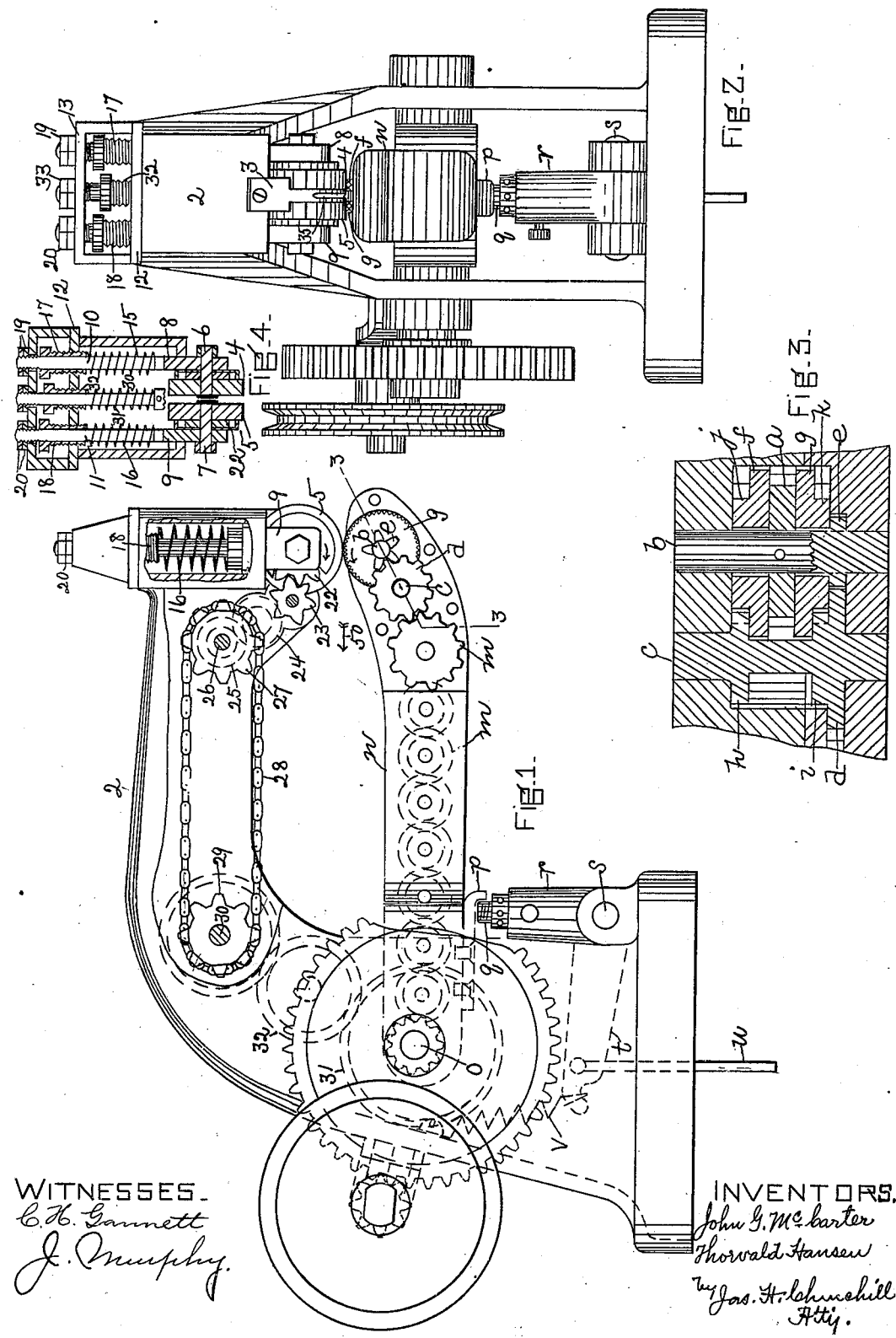
WITNESSES
C. H. Gannett
J. Murphy
INVENTORS
John G. McCarter
Thorvald Hansen
by Jas. H. Churchill
Atty.

UNITED STATES PATENT OFFICE.

JOHN G. McCARTER, OF HYDE PARK, AND THORVALD HANSEN, OF EVERETT, MASSACHUSETTS.

SEAM-RUBBING AND WELT-PROTECTING MACHINE.

SPECIFICATION forming part of Letters Patent No. 651,424, dated June 12, 1900.

Application filed December 26, 1899. Serial No. 741,561. (No model.)

*To all whom it may concern:*

Be it known that we, JOHN G. MCCARTER, residing in Hyde Park, in the county of Norfolk, and THORVALD HANSEN, residing in Everett, in the county of Middlesex, State of Massachusetts, citizens of the United States, have invented an Improvement in Seam-Rubbing and Welt-Protecting Machines, of which the following description, in connection with the accompanying drawings, is a specification, like letters and figures on the drawings representing like parts.

This invention relates to a machine for rubbing down seams of boots and shoes and is an improvement upon the machine shown and described in United States Patent No. 622,252, granted to us April 4, 1899.

The present invention has for its object to provide feed rolls or wheels on opposite sides of the welt-guide, which feed-rolls are positively driven and yet are free to yield independent of each other, so as to compensate for different thicknesses of stock. The positively-driven and yielding feed-rolls act to not only assist in the feeding of the upper, but also act to press the upper down over the welt-seam, thereby imparting to the said upper the shape desired. These and other features of this invention will be pointed out in the claims at the end of this specification.

Figure 1 is a side elevation, with parts broken away, of a welt-seam-rubbing-down machine embodying this invention; Fig. 2, a front elevation of the machine shown in Fig. 1; Fig. 3, a sectional detail on the line 3 3 to be referred to, and Fig. 4 a sectional detail of the yielding feed-rolls.

The rubbing-down disk or wheel *a*, fast on the shaft *b*, driven from the counter-shaft *c* by gear *d* and pinion *e*, and the feed-wheels *f g*, loose on shaft *b* and driven from the counter-shaft *c* by pinions *h i* and gears *j k*, and the intermediate gears *m*, carried by the hollow arm *n*, pivotally mounted on the shaft *o* and normally held in its elevated position by the locking device *p*, engaging the screw *q*, carried by the arm *r* of the elbow-lever mounted on the pivot *s* and having its arm *t* connected to a foot-treadle (not shown) by a rod *u* and acted upon by a spring *v*, are and may be the same as shown in the patent above referred to.

The overhanging arm 2 carries a yielding welt-guide 3, which coöperates with the rubbing-down disk *a*, and in accordance with this invention the overhanging arm 2 also carries independently-yielding and positively-driven feed wheels or rolls 4 5, located on opposite sides of the welt-guide and coöperating with the feed-wheels *f g*. The feed-wheels 4 5 are loosely mounted on suitable studs 6 7, (see Fig. 4,) extended from the slide-bars 8 9, which are provided with threaded rods 10 11, forming extensions of said bars. The threaded rods 10 11 are extended up through openings in the top plate 12 of the arm 2 and also up through the cross-bar 13 of a cap or yoke 14, and said rods are encircled by springs 15 16, which are adjustable by exteriorly-threaded sleeves 17 18 engaging screw-threads in the top plate 12. The springs 15 16 act to force the slide-bars 8 9 and the feed-wheels 4 5 downward, and this downward movement may be controlled by nuts 19 20, which engage the threaded rods 10 11 above the cross-bar 13. The slide-bars and feed-wheels are thus limited as to their downward movement, but are free to be moved upward by the leather interposed between them and the hollow arm *n*, the springs 15 16 acting to hold the feed-wheels in engagement with the upper of the boot or shoe with a yielding pressure which can be regulated to the particular stock being operated upon and which is sufficient to lay over or conform the upper to the welt-seam.

The feed-wheels 4 5 may be positively driven by mechanism, as will now be described. Each feed-wheel is pinned or otherwise fastened to a gear 22, loose on its stud or shaft, and the said gear is driven by gears or pinions 23 24 25 from a shaft 26, having thereon a sprocket-wheel 27, which is connected by a link chain 28 with a sprocket-wheel 29 on a shaft 30, driven from the shaft *o* by gears 31 32. The tension of the springs 15 16 may be regulated by the nuts or threaded sleeves 17 18.

The welt-guide 3 is secured to the threaded rod 30, encircled by a spring 31, which is adjusted by a threaded sleeve or nut 32, and the downward movement of the welt-guide by the spring 31 is limited by the nuts 33.

In operation the upper of the boot or shoe is slipped over the horn or movable arm $n$, right side out, and the welt enters the groove or slot 35 in the welt-guide 3, and the machine being set in motion the upper is positively fed forward in the direction indicated by the arrow 50, Fig. 1, by the positively-driven feed-rolls $f\ g$ engaging the inner side of the upper and by the positively-driven feed-rolls 4 5 engaging the outer side of the upper on opposite sides of the welt and in a substantially-vertical line with the feed wheels or rolls $f\ g$, which insures the upper being laid over or pressed down upon the welt-seam and imparting to the said upper the ogee shape desired without the necessity of subsequent operations.

The independently-yielding feed-rolls 4 5 adapt themselves to inequalities in the stock, and by positively driving said rolls the upper may be quickly and easily fed through the machine and the work performed in a minimum time.

We claim—

1. In a machine of the class described, the combination with a rubbing-down wheel or roll adapted to engage the inner side of the upper, of yielding feed-rolls arranged side by side but separated from each other and adapted to engage the outer side of the said upper on opposite sides of the rubbing-down wheel or roll, substantially as described.

2. In a machine of the class described, the combination with a rubbing-down wheel or roll adapted to engage the inner side of the upper, of yielding feed-rolls arranged side by side but separated from each other and adapted to engage the outer side of said upper on opposite sides of the rubbing-down wheel or roll, and means to positively rotate said feed-rolls, substantially as described.

3. In a machine of the class described, the combination with a framework having a welt-guide, of an arm supported by said framework and movable toward and from said welt-guide, a rubbing-down tool and feed-wheels carried by said arm, means to rotate said tool and feed-wheels, independently-yielding feed-rolls carried by said framework on opposite sides of said welt-guide, and means to positively rotate the feed-rolls carried by said framework, substantially as described.

4. In a machine of the class described, the combination with a welt-guide, of independently-yielding feed-rolls located on opposite sides of said welt-guide, substantially as described.

5. In a machine of the class described, the combination with a welt-guide, of independently-yielding feed-rolls located on opposite sides of said welt-guide, and means to positively rotate said feed-rolls, substantially as described.

6. In a machine of the class described, the combination with a rotary rubbing-down tool, feed-wheels located on opposite sides of said tool, means to rotate said tool and feed-wheels, a welt-guide coöperating with said rubbing-down tool, independently-yielding feed-wheels or rolls located on opposite sides of the welt-guide, and means to positively rotate said feed-rolls, substantially as described.

In testimony whereof we have signed our names to this specification in the presence of two subscribing witnesses.

JOHN G. McCARTER.
THORVALD HANSEN.

Witnesses:
JAS. H. CHURCHILL,
J. MURPHY.